(12) United States Patent
Todani

(10) Patent No.: US 6,567,221 B2
(45) Date of Patent: May 20, 2003

(54) HIGH ZOOM RATIO LENS DEVICE HAVING FOCUS AND ZOOM CAMS

(75) Inventor: Satoshi Todani, Saitama (JP)

(73) Assignee: Tamron Co., Ltd., Saitama (JP)

( * ) Notice: Subject to any disclaimer, the term of this patent is extended or adjusted under 35 U.S.C. 154(b) by 0 days.

(21) Appl. No.: 10/053,678

(22) Filed: Jan. 24, 2002

(65) Prior Publication Data

US 2002/0111760 A1 Aug. 15, 2002

(30) Foreign Application Priority Data

Feb. 9, 2001 (JP) ........................................ 2001-034422
Oct. 10, 2001 (JP) ........................................ 2001-312347

(51) Int. Cl.[7] ............................. G02B 15/14; G02B 7/02
(52) U.S. Cl. ...................... 359/699; 359/700; 359/701; 359/823
(58) Field of Search ................................. 359/695, 699, 359/700, 701, 823

(56) References Cited

U.S. PATENT DOCUMENTS 4,333,712 A * 6/1982 Tomori ........................ 359/700
5,978,156 A * 11/1999 Okada et al. ................ 359/699
6,333,825 B1   12/2001 Hamasaki et al. .......... 359/699

FOREIGN PATENT DOCUMENTS

| JP | 1-154110 | 6/1989 | ............ G02B/7/10 |
| JP | 8-304684 | 11/1996 | ............ G02B/7/04 |
| JP | 2000-89086 | 3/2000 | ............ G02B/7/04 |

* cited by examiner

Primary Examiner—Ricky Mack
(74) Attorney, Agent, or Firm—Jacobson Holman PLLC

(57) ABSTRACT

The invention is directed to provide a high zoom ratio lens that can be configured to be efficiently downsized and to effectively attain sufficient compensation rate for focusing a lens component in any type of zoom ranges. The high zoom ratio lens comprises a focusing lens (B) that moves forward and backward while simultaneously moving in a circumferential direction during zooming and focusing, and a focusing cam barrel (9) that includes a first focusing cam (103) moving the focusing lens (B) during the focusing, a zooming cam (100) moving the focusing lens (B) during the zooming, and a second focusing cam (102) compensating for a displacement of the first focusing cam (103) and a telescopic movement of the focusing cam barrel (9) in any of zoom ranges. The high zoom ratio lens further comprises a stud (C) that is engaged with the zooming cam (100) and moves within a range corresponding to circumferential movement of the first focusing cam (103).

1 Claim, 6 Drawing Sheets

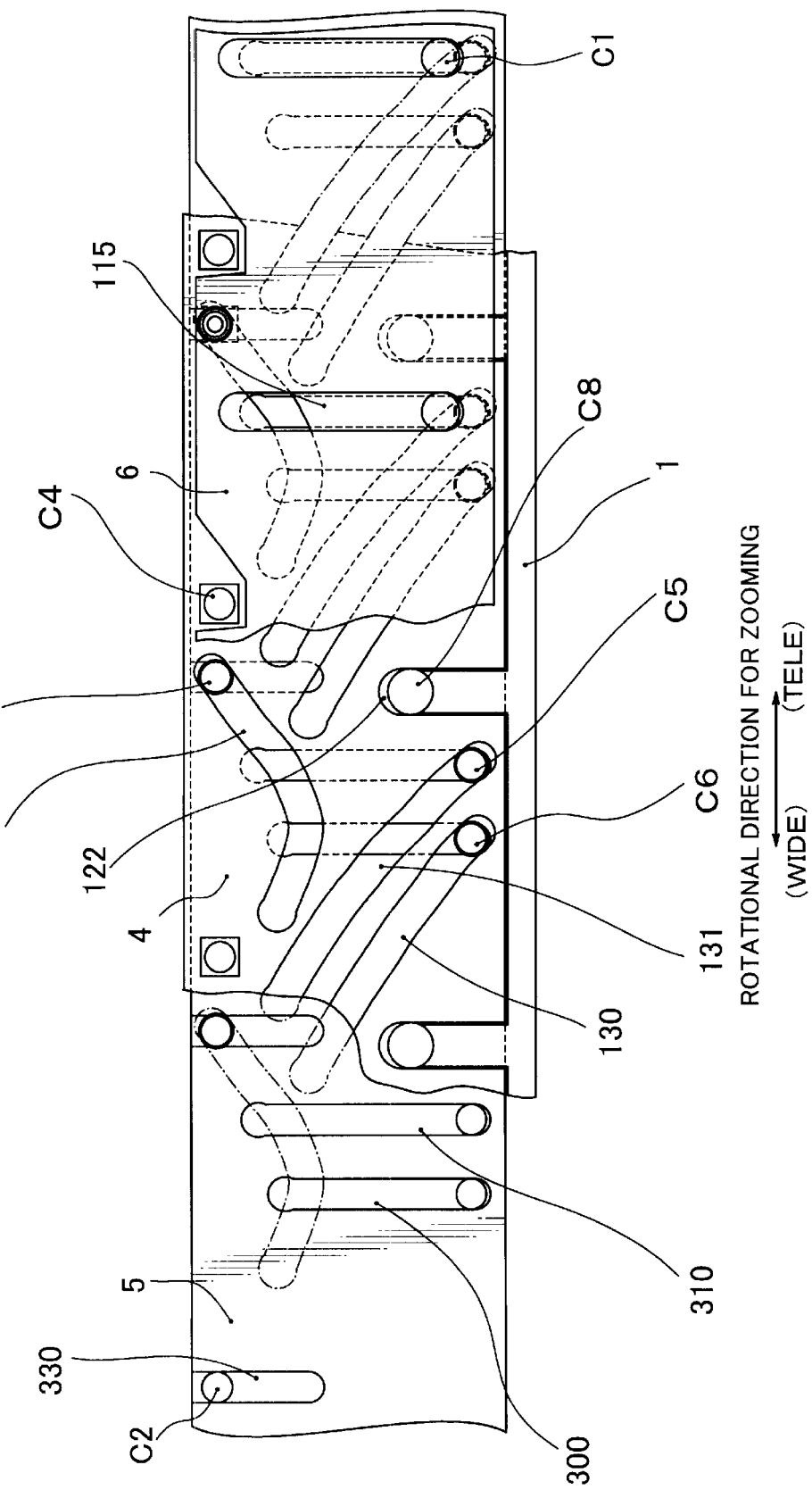

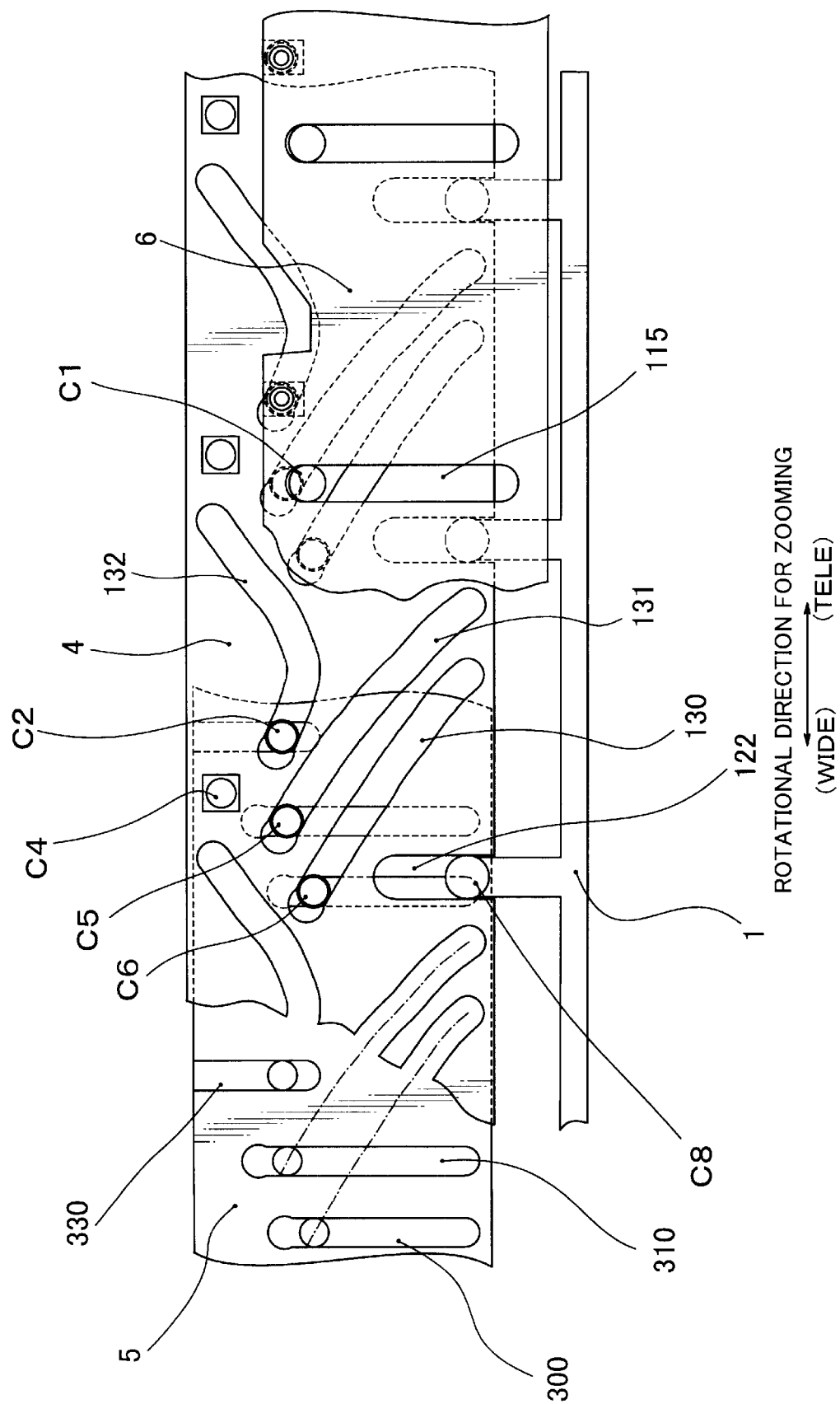

HIGH ZOOM RATIO LENS DEVICE HAVING FOCUS AND ZOOM CAMS

FIELD OF THE INVENTION

The present invention relates to an inner-focusing high zoom ratio lens, and more particularly, to a high zoom ratio lens that is designed to be downsized and to designate zoom adjusting ranges in a part of a shorter depth of focus.

BACKGROUND ART

The prior art inner-focusing high zoom ratio lens has a greater variation in a feeding distance of a focusing lens with respect to the higher close-up point, and when a single focusing cam is provided to magnify a close-up performance, a displacement to focus becomes resultantly increased in the remaining zoom ranges, which leads to a necessity for vari-focal feature. Focusing cam curves used to shift a point of such vari-focal operation to a zoom range require appropriate balance of parameters of zooming and focusing. However, it is difficult to ensure a well-balanced cam configuration to attain smooth zooming and focusing, and hence, a rotation angle of a focusing cam must be altered, or some compensation is required in the focusing cam.

Japanese Patent Laid-Open No. H8-304684 discloses a high zoom ratio lens in which a focusing lens moves forward and backward while simultaneously moving in a circumferential direction during either zooming or focusing. A cam configuration is used for a guide groove that urges a focusing cam barrel to circumferentially move while a cam pin fitted in the guide groove moves therein along in the focusing cam barrel, so that a displacement in a circumferential direction distorts an operational range with the focusing cam during zooming so as to attain an appropriate displacement in any of zoom ranges for focusing.

However, it is still difficult to ensure a sufficient displacement to magnify a close-up performance and to attain a displacement for focusing under a restricted condition of shift of focal point in the entire zoom range.

In a high zoom ratio lens disclosed in Japanese Patent Laid-Open No. 2000-89086, a focus compensating cam is disposed in a rotational member along with a focusing cam in order to attain an appropriate displacement to focus. However, since a focus lens in such mechanism is designed to linearly move during zooming, a displacement is fixed in any zoom range, and a sufficient displacement for compensation cannot be ensured to shorten a close-up depth in any zoom range of the high zoom ratio lens.

The present invention is made to overcome the above-mentioned disadvantages in the prior art inner-focusing zoom lens. Accordingly, it is an object of the present invention to provide a high zoom ratio lens that can be configured to be efficiently downsized and to effectively attain sufficient compensation rate for focusing lenses in any type of zoom ranges.

It is another object of the present invention to provide a high zoom ratio lens that can be configured to effectively designate zoom adjusting ranges in a part attaining a shorter depth of focus.

SUMMARY OF THE INVENTION

The invention is directed to provide a high zoom ratio lens that can be configured to be efficiently downsized and to effectively attain sufficient compensation rate for focusing a lens component in any type of zoom ranges. The high zoom ratio lens comprises a focusing lens B that moves forward and backward while simultaneously moving in a circumferential direction during zooming and focusing, and a focusing cam barrel 9 that includes a first focusing cam 103 moving the focusing lens B during the focusing, a zooming cam 100 moving the focusing lens B during the zooming, and a second focusing cam 102 compensating for a displacement of the first focusing cam 103 and a telescopic movement of the focusing cam barrel 9 in any of zoom ranges. The high zoom ratio lens further comprises a stud C that is engaged with the zooming cam 100 and moves within a range corresponding to circumferential movement of the first focusing cam 103.

BRIEF DESCRIPTION OF THE DRAWINGS

A best mode for implementing the present invention will be described in detail in conjunction with the accompanying drawings, and like reference numerals denote similar components throughout the drawings in which

FIG. 5 is an exploded view of a zoom mechanism, showing the high zoom ratio lens in the zoom-wide mode; and FIG. 6 is an exploded view of the focusing mechanism, showing the high zoom ratio lens in the zoom-tele mode.

DETAILED DESCRIPTION OF THE INVENTION

Best Mode of the Preferred Embodiment

Figure 1:
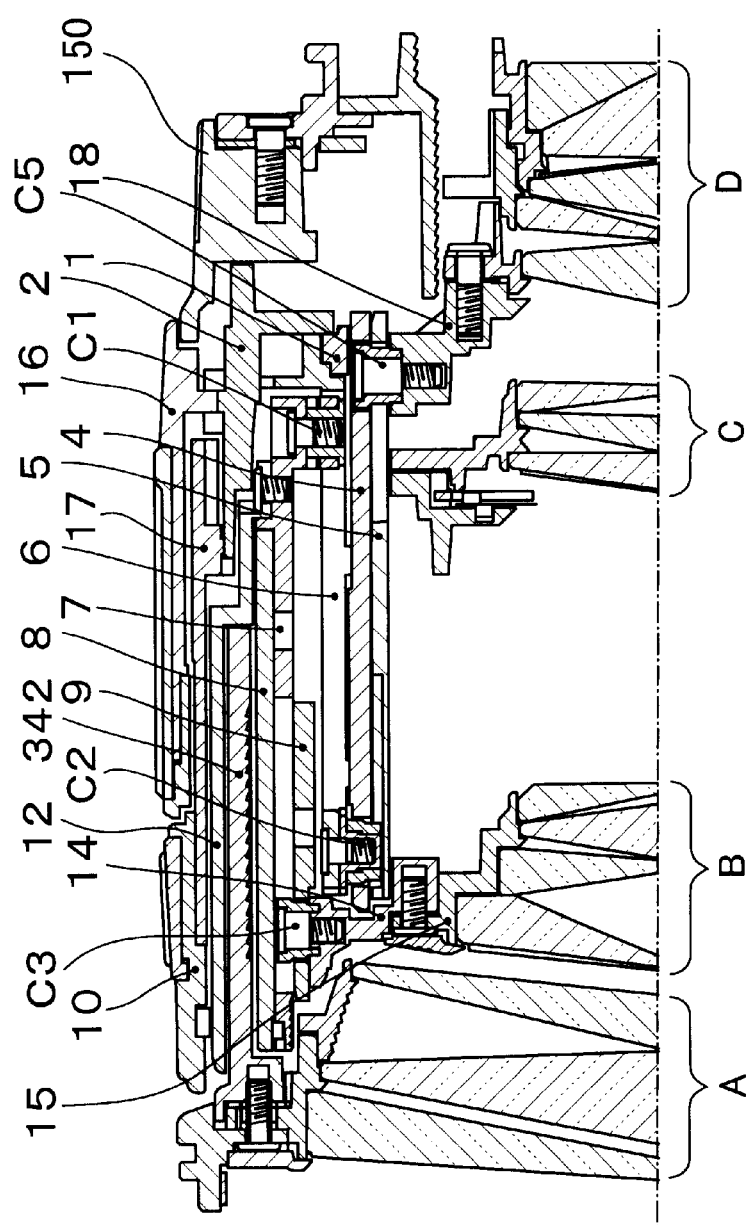
FIG. 1 is a sectional view illustrating an embodiment of a high zoom ratio lens according to the present invention, being operative in a zoom-wide mode.
Figure 2:
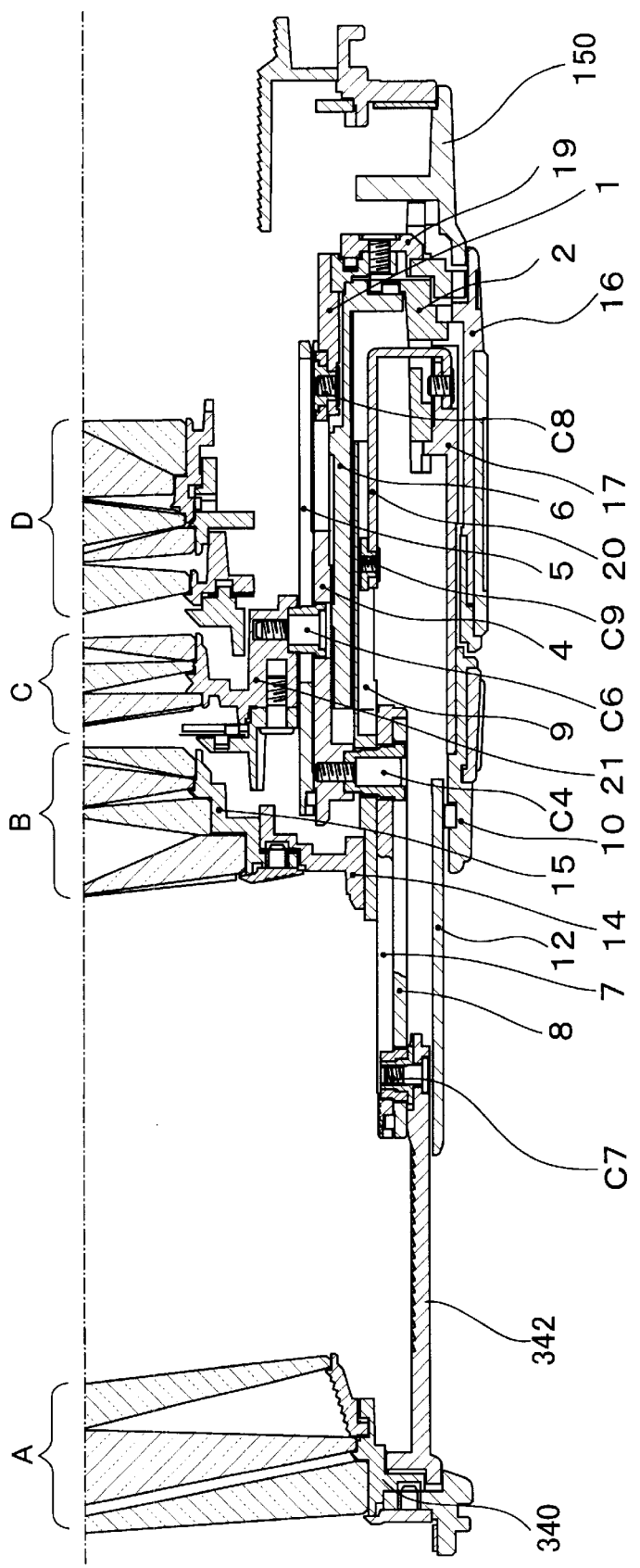
FIG. 2 is a sectional view illustrating the exemplary high zoom ratio lens in a zoom-tele mode.
Figure 3:
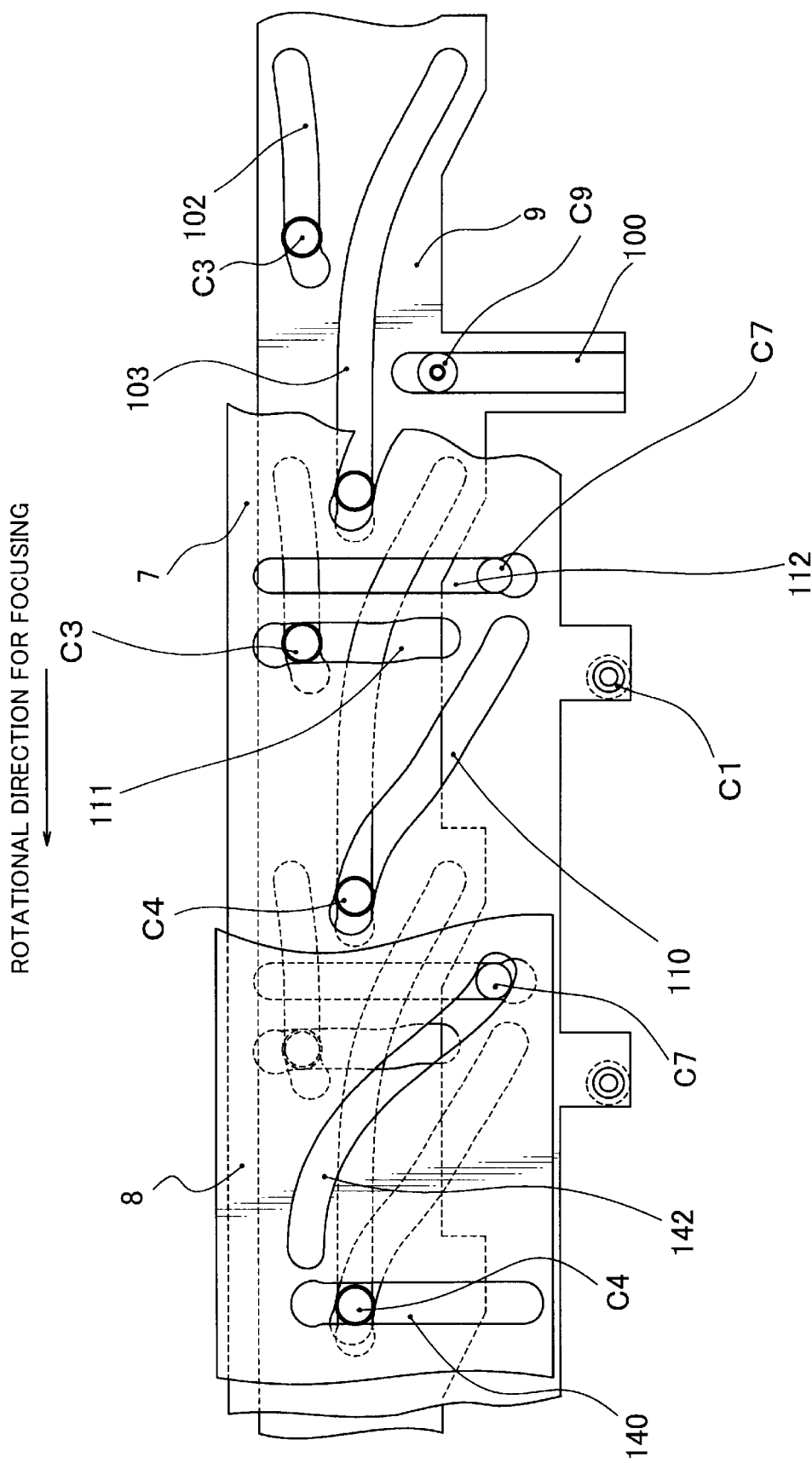
FIG. 3 is an exploded view of a focusing mechanism, showing the high zoom ratio lens in the zoom-wide mode.
Figure 4:
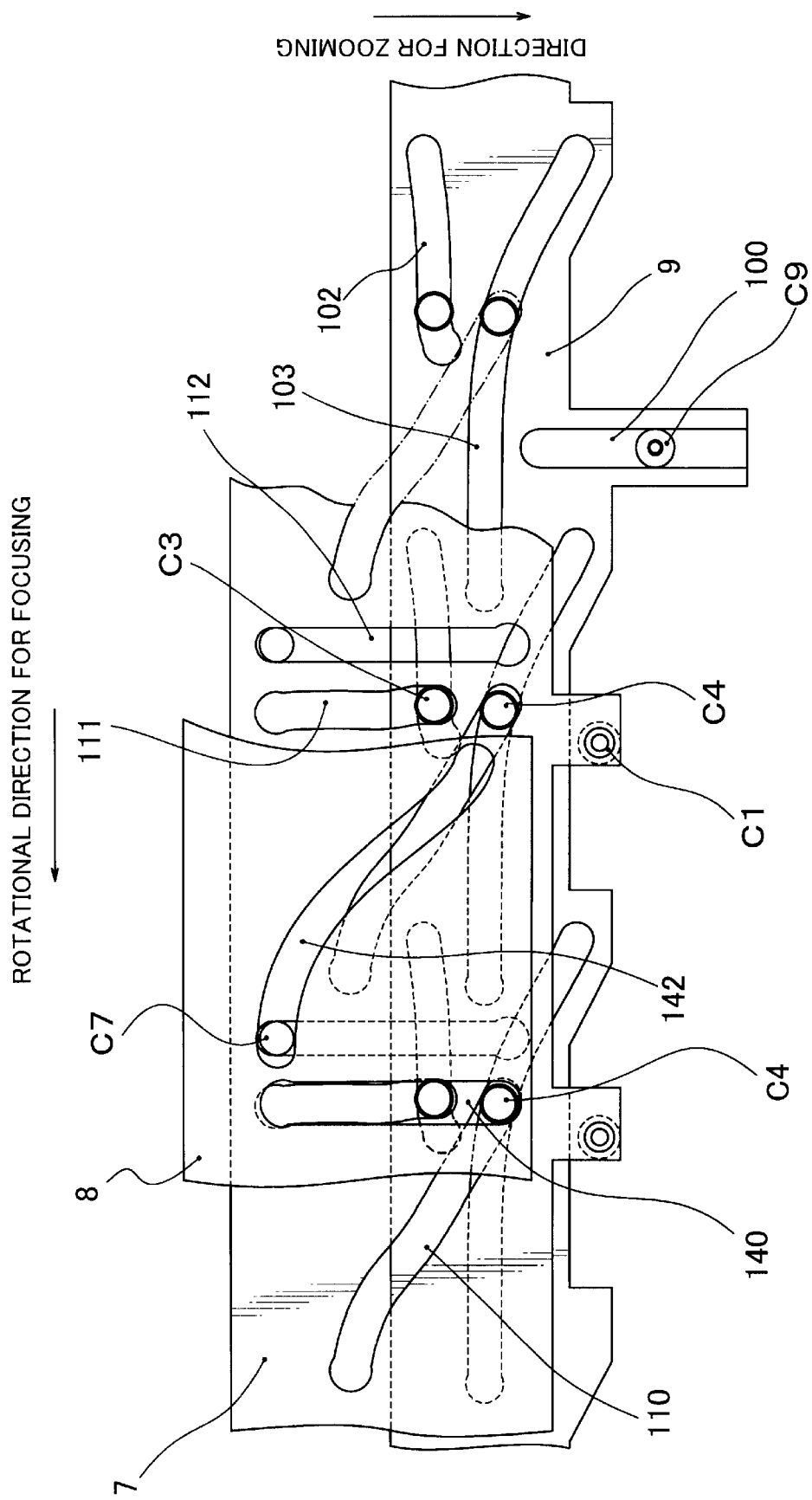
FIG. 4 is an exploded view of the focusing mechanism, showing the high zoom ratio lens in the zoom-tele mode.

A preferred embodiment of a high zoom ratio lens according to the present invention will now be described with reference to the drawings. FIG. 1 is a sectional view illustrating an exemplary high zoom ratio lens in a zoom-wide mode. FIG. 2 is a sectional view illustrating the high zoom ratio lens in a zoom-tele mode. FIG. 3 is an exploded view of a focusing mechanism, showing the high zoom ratio lens in the zoom-wide mode. FIG. 4 is an exploded view of the focusing mechanism, showing the high zoom ratio lens in the zoom-tele mode. FIG. 5 is an exploded view of a zoom mechanism, showing the high zoom ratio lens in the zoom-wide mode. FIG. 6 is an exploded view of the focusing mechanism, showing the high zoom ratio lens in the zoom-tele mode.

The high zoom ratio lens 1 of the preferred embodiment is comprised, as can be seen in FIGS. 1 and 2, of first to fourth groups of lenses, A to D, and the lenses of the second group B are used for focusing.

<Focusing Mechanism and its Function>

Referring to FIGS. 1 to 4, a focusing mechanism for moving the focusing lenses of the second group B will be described. A focusing ring 10 circumferentially rotated automatically or by hand is coupled to a coupling barrel 17, as shown in FIG. 1. The coupling barrel 17 is mounted on a middle lens barrel 2 in bayonet engagement therewith to restrain forward and backward movement. As shown in FIG. 2, the coupling barrel 17 is connected to a focusing coupler 20 and rotates along with the focusing ring 10 as it rotates.

The focusing coupler 20 is provided with a cooperative focusing stud C9. The stud C9 is engaged with a cooperative focusing groove 100 defined in a focusing cam barrel 9 to cause the cam barrel 9 to circumferentially rotate.

The focusing cam barrel 9 is provided with a first focusing cam 103. The first cam 103 is engaged with a stud C4 planted in a first cam barrel 4 for causing the lenses of the second group B to move, and the cam barrel 9 is guided by the stud C4.

The lenses of the second group B are supported by a frame 14 supporting the second group of lenses, and a stud C3 moving the focusing lenses is planted in an outer circumference of the frame 14, as shown in FIG. 1.

The stud C3 used to move the focusing lenses is guided by a focusing converter cam 111 and a second focusing cam 102, and the cam 111 is provided in a second linearly moving barrel 7 while the cam 102 is provided in the focusing cam barrel 9.

The focusing mechanism functions to displace only the lenses of the second group B among other lens groups during the focusing. With the focusing ring 10 being circumferentially moved manually or by a motor (not shown), accordingly the coupling barrel 17, the coupler 20, and the stud C9 rotationally move. The stud C9 is fitted in the groove 100 and transmits its rotational force to the cam barrel 9.

As the focusing cam barrel 9 rotationally moves, the stud C4 for displacement of the second group of the lenses guides the first cam 103 of the cam barrel 9 in engagement therewith to circumferentially move the cam barrel 9 while simultaneously moving the same forward and backward as required.

Such forward and backward displacement and circumferential movement of the cam barrel 9 result in the second cam 102 therein and the focusing converter cam 111 in the second barrel 7 causing the stud C3 to move which, in turn, causes the lenses of the second group B to move for the focusing.

<Zooming Mechanism and its Performance>

Referring to FIGS. 1, 2, 5, and 6, the zooming mechanism and its performance will be described. A zoom ring 16 that is manually moved in circumferential directions is supported on the middle lens barrel 2 by a bayonet, and its forward and backward movement is restricted.

The zoom ring 16 is engaged with a cooperative zoom lever 19 with a cooperative zoom ring 1 intervening therebetween. The ring 1 is in position between a longitudinally grooved barrel 6 and the middle lens barrel 2 both of which are integrally attached to a rear lens barrel 150, and the ring 1 is capable simply of rotational movement therebetween. As illustrated in FIGS. 2 and 5, the ring 1 is planted with a stud C8 cooperatively aiding the first cam barrel in zooming. The stud C8 is fitted in a cooperative zoom guide groove 122 to circumferentially move the first cam barrel 4. The first cam barrel 4 is provided with zoom cams 130, 131, and 132 for the third, fourth, and second groups of lenses, respectively, and is further provided with the stud C4 for the second group of lenses.

A first linearly moving barrel 5 is placed within the first cam barrel 4. A guide stud C2, which is planted in the longitudinally grooved barrel 6 to telescopically urge the first linearly moving barrel, is fitted in a guide groove 330 cooperatively aiding in telescopic displacement of the first linearly moving barrel, thereby permitting the first linearly moving barrel 5 to move forward and backward but not to rotationally move. The first linearly moving barrel 5 is further provided with guide grooves 300 and 310 for urging the third and fourth groups of lenses, respectively.

A stud C6, integral with a frame 21 holding and moving the third group C of lenses, is engaged with the zoom cam 130 provided in the first cam barrel 4 to move the third group of lenses, and is fitted in the guide groove 300 provided in the first linearly moving barrel 5 to cooperatively move the same group of lenses.

A stud C5, integral with a frame 22 holding and moving the fourth group D of lenses, is engaged with the zoom cam 131 provided in the first cam barrel 4 to move the fourth group of lenses, and is fitted in the guide groove 310 provided in the first linearly moving barrel 5 to cooperatively move the same group of lenses.

As illustrated in FIGS. 1 and 4, the second linearly moving barrel 7 is superposed over the focusing cam barrel 9, and a second cam barrel 8 is superposed on the second linearly moving barrel 7. The second linearly moving barrel 7 is provided with the focusing converter cam 111 fitted on the stud C3 to urge the focusing lenses, the zoom cam 110 engaged with the stud C4 to move the second group of lenses, and a guide groove 112 in relation with the first group of lenses. The second linearly moving barrel 7 has its rear end provided with a stud C1 that is fitted in a guide groove 115 in the longitudinally grooved barrel 6 to telescopically urge the second linearly barrel. The second cam barrel 8 is provided with a rectilinear groove 140 fitted on the stud C4 to cooperatively move the second group of lenses, and a zoom cam 142 engaged with the stud C7 to cooperatively move the first group of lenses. The stud C7 is directed inwardly in a lens barrel 342 that supports a lens frame 340 holding the first group A of lenses.

Then, functions of the above-mentioned zoom mechanism will now be described. A single zoom procedure causes all the groups of lenses, from first A to fourth D, to move. As the zoom ring 16 is circumferentially moved, the cooperative zoom ring 1 follows it to rotate.

Circumferential movement of the ring 1 causes rotation of the first cam barrel 4 because of the stud C8 in the ring 1 fitting in the guide groove 122 in the first cam barrel 2. The rotation of the first cam barrel 4 would not permit the stud C2 to cause circumferential movement of the first linearly moving barrel 5, and hence, the guide groove 300 and the stud C6 engaged with the zoom cam 130 cooperatively functions to move the third group D of lenses for the zooming. The rotation of the first cam barrel 4 further causes the guide groove 310 and the stud C5 engaged with the zoom cam 131 to cooperatively function to move the fourth group E of lenses for the zooming, as well.

The zoom cam 132 and the stud C2 engaged therewith and fixed in the longitudinally grooved barrel 6 function to permit the first cam barrel 4 to rotate and simultaneously move backward and forward, and also to permit the first linearly moving barrel 5 to follow the first cam barrel 4 forward and backward without circumferential movement.

The rotation of the first cam barrel 4 also brings about forward and backward displacement of the focusing cam barrel 9 because of the engagement of the stud C4 fixed to the first cam barrel 4 and the effect of the stud C9 to inhibit circumferential movement of the focusing cam 9. The forward and backward displacement of the cam barrel 9 results in the second group B of lenses to move for the zooming by virtue of the stud C3 intervening between them.

The rotational movement and forward and backward movement of the first cam barrel 4 followed by the stud C4 in its rotational movement and forward and backward movement are transmitted to the second cam barrel 8. The second cam barrel 8 and the linearly moving barrel 7 following it to move forward and backward is affected by the forward and backward displacement of the stud C4. The rotational movement and forward and backward movement of the stud C4 urge the second cam barrel 8 and the second linearly moving barrel 7 moving forward and backward along with it to move the lens barrel 342 of the first group of lenses through cam engagement of the zoom cam 142 with the stud C7. Thus, a displacement of the first group A of lenses for the zooming is regarded as the sum of displacements resulted from cam components of the first and second cam barrels 4 and 8.

Thus, in accordance with the present invention, a high zoom ratio lens can be configured to be efficiently downsized and to effectively attain sufficient compensation rate for focusing lenses in any type of zoom ranges.

Also, according to the present invention, a high zoom ratio lens can be configured to effectively designate zoom adjusting ranges in a part attaining a shorter depth of focus.

What is claimed is:

1. An inner focus, high zoom ratio lens device having first, second, third and fourth lens groups, the second lens group moving along an optical axis during a zooming operation and a focusing operation, the high zoom ratio lens comprising:

a focusing lens stud united with the second lens group;

a focusing cam barref having a first focusing cam and a second focusing cam, said second focusing cam engaging with said focusing lens stud, said focusing cam barrel turned by a focusing ring;

a first cam barrel turned by a zooming ring and having a second lens group displacement stud thereon engaging with said first focusing cam;

a first linearly moving barrel axially following said first cam barrel without circumferential movement; and a second linearly moving barrel moving axially without circumferential movement and having a zoom cam for engaging with said second lens group displacement stud, and a focus converter cam for engaging with said focusing lens stud;

wherein a focusing operation is made by turning said focusing ring to move said focusing lens stud in said second focusing cam so as to move the second lens group axially;

a zooming operation being made by turning said zooming ring to move said first cam barrel axially with circumferential movement, the second lens group displacement stud being moved in the first focusing cam of the focusing cam barrel which is prevented from circumferential movement by the focusing ring so that the focusing cam barrel is axially moved, the focusing lens stud being moved in the focus converter cam and the second focusing cam, so as to move the second lens group axially.

* * * * *